Feb. 28, 1961 — F. M. STINTON — 2,972,813
FLIGHT TIME COMPUTER
Filed May 5, 1958 — 5 Sheets-Sheet 1
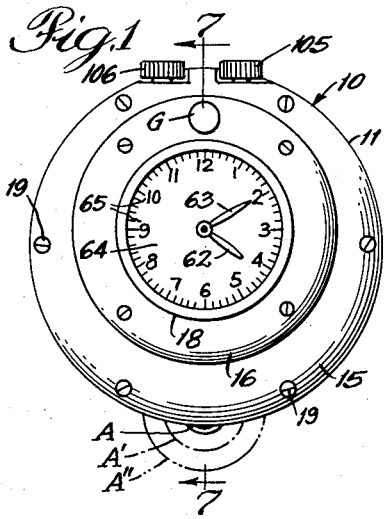
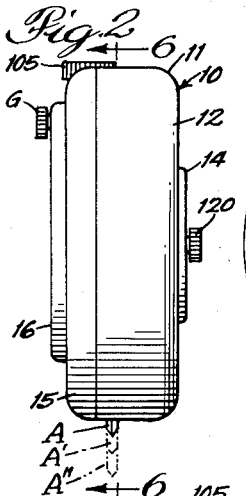
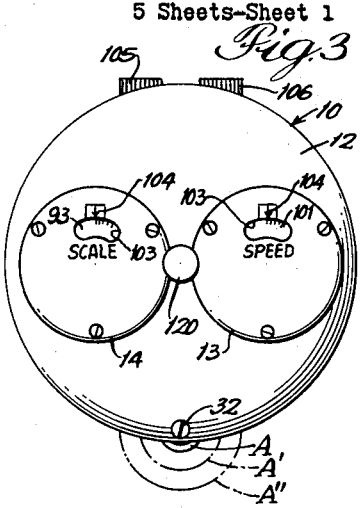
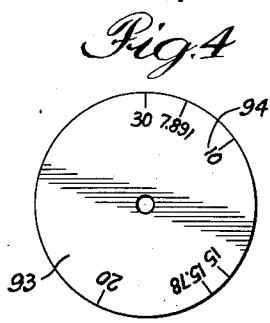
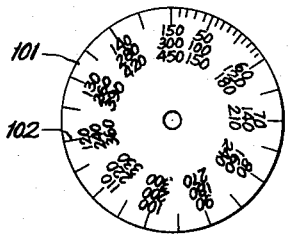
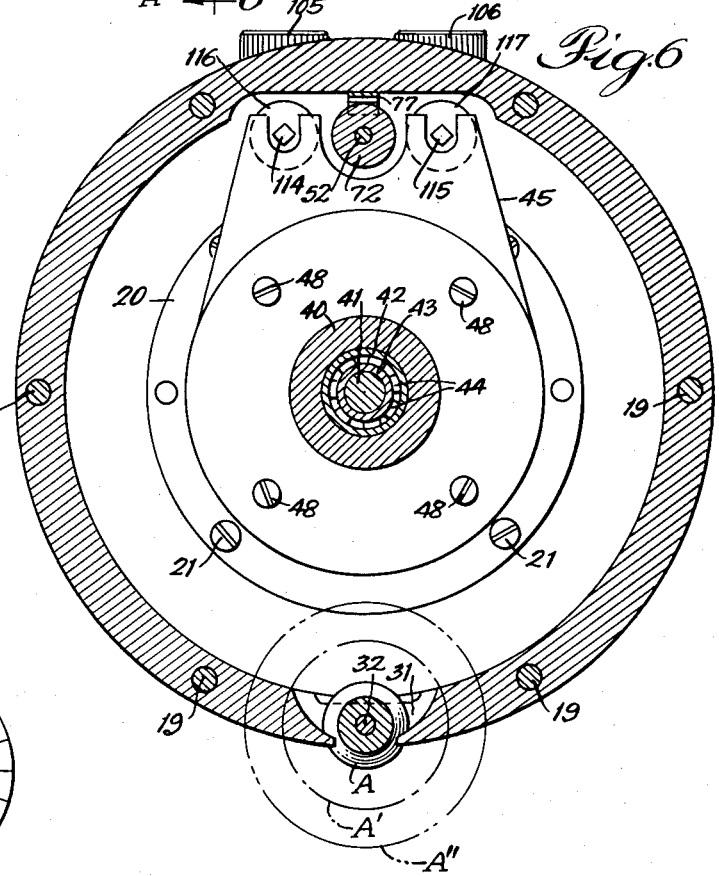
INVENTOR:
Frederick M. Stinton,
BY Dawson, Tilton, Fallon & Lungmus,
ATTORNEYS.

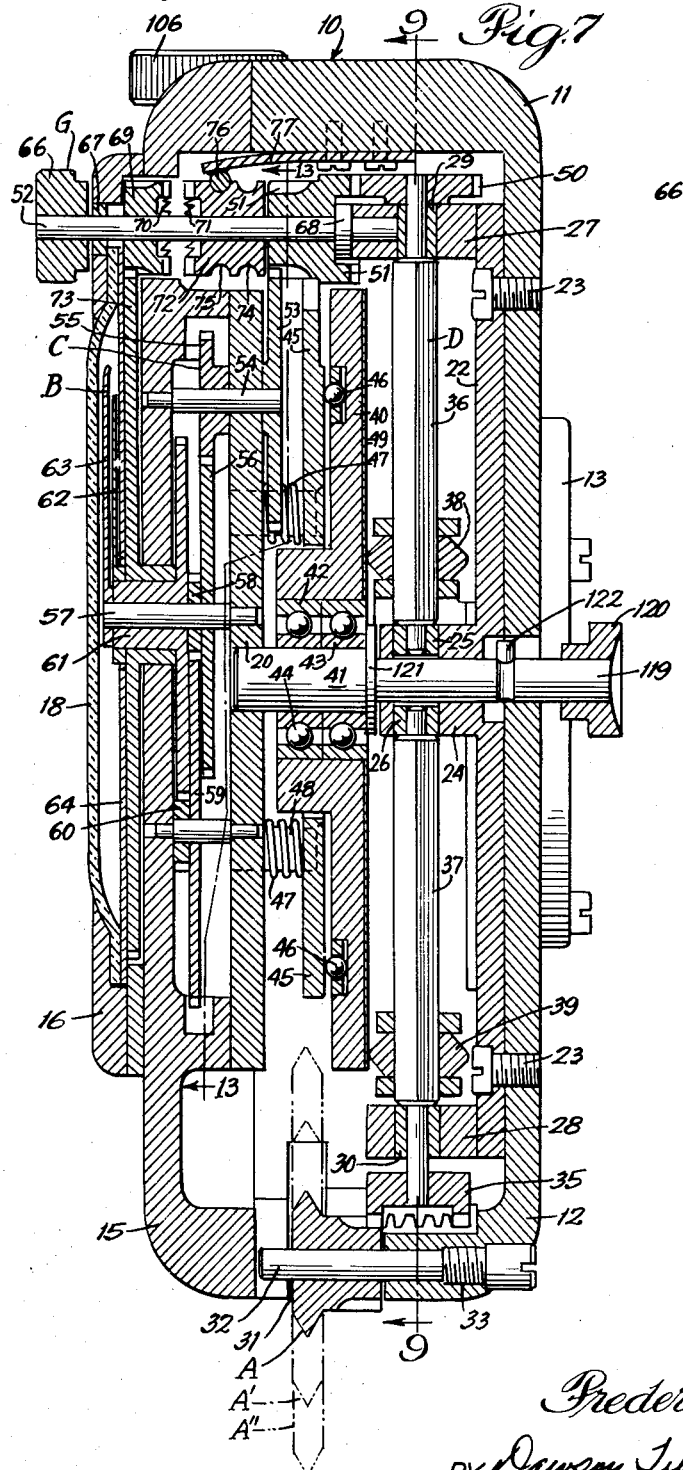

Feb. 28, 1961  F. M. STINTON  2,972,813
FLIGHT TIME COMPUTER
Filed May 5, 1958  5 Sheets-Sheet 4
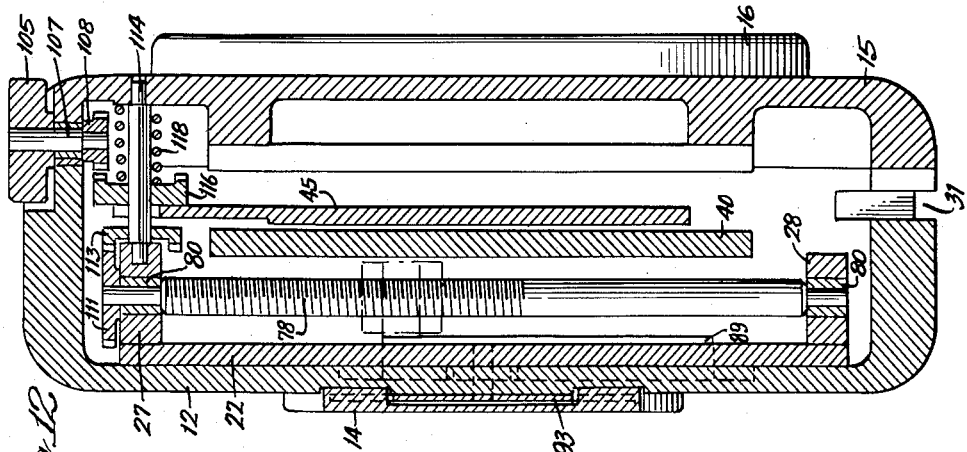
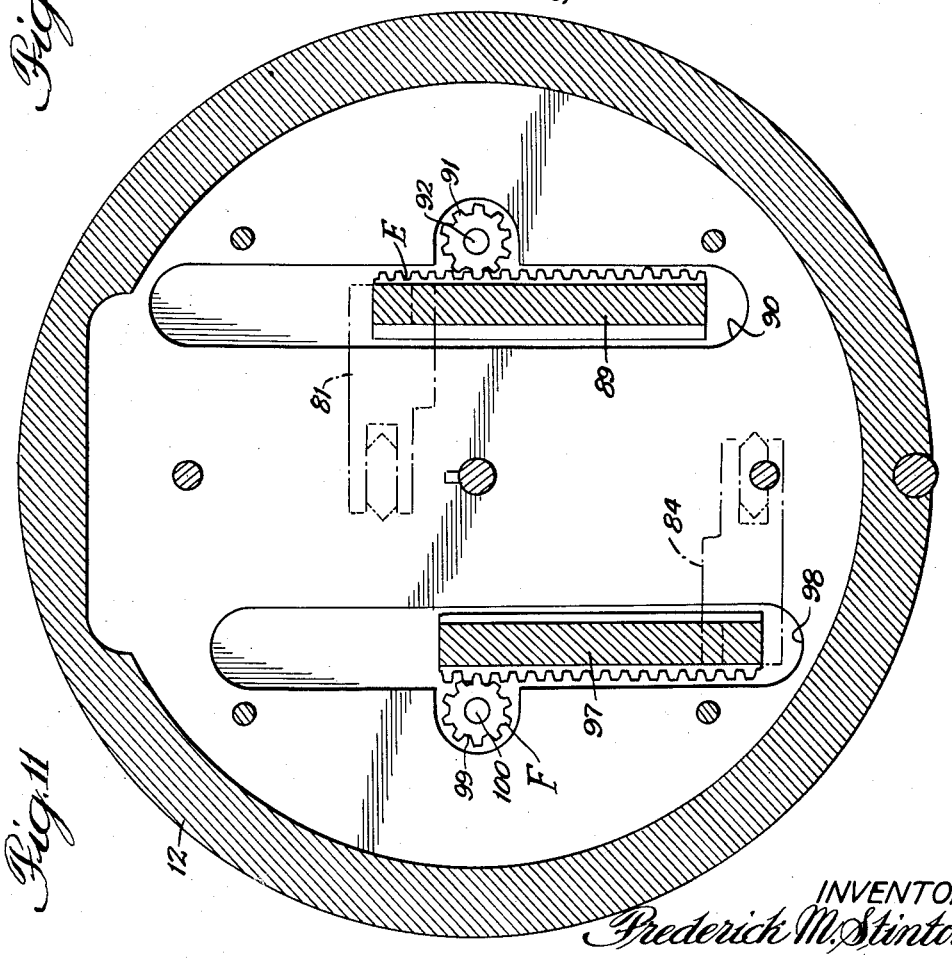
INVENTOR:
Frederick M. Stinton,
BY Dawson, Tilton, Fallon & Lungmus,
ATTORNEYS.

Feb. 28, 1961 F. M. STINTON 2,972,813
FLIGHT TIME COMPUTER
Filed May 5, 1958 5 Sheets-Sheet 5

INVENTOR:
Frederick M. Stinton,
BY
ATTORNEYS.

United States Patent Office 2,972,813
Patented Feb. 28, 1961

2,972,813
FLIGHT TIME COMPUTER
Frederick M. Stinton, 650 Dixie St., Liberty, Mo.
Filed May 5, 1958, Ser. No. 733,129
5 Claims. (Cl. 33—142)

This invention relates to a flight time computer, and more specifically, to an instrument particularly adapted for use in aerial navigation for computing and indicating the time of arrival at, or the time required to reach, any given destination.

To a pilot or navigator guiding an airplane towards its destination, the actual distance in miles to that destination is meaningful only when considered in terms of speed. Thus, a pilot's thinking in any phase of navigation tends to be in hours and minutes of flying time rather than in miles. The actual distance remaining to be covered simply provides a figure from which the ultimate fact of interest, the time of flight in hours and minutes, or the time of arrival, may be calculated for any given ground speed.

While a number of time computers are commercially available, such devices merely simplify the conversion of miles into hours and minutes and do not eliminate or reduce the steps involved in computing an estimated time of arrival. To determine the estimated arrival time at a given destination, three distinct steps are still required: (1) The measurement of distance; (2) the computation of time en route by manipulation of the computer; and (3) the addition of the computed time to the existing time of day. If the ground speed or the route are altered, then some or all of these steps must be repeated to determine the corrected arrival time. Obviously, such a procedure is time consuming and is undesirable to the extent that it reduces the time devoted by the pilot to visual observation and positive control of the aircraft. Furthermore, each step in determining the flight time or time of arrival is subject to human error with the attending possibility of disastrous consequences should a significant error remain undetected.

Therefore, one of the principal objects of the present invention is to provide a compact instrument which will automatically compute and register in hours and minutes the estimated time of arrival at a given destination when the instrument is rolled between the starting point and destination point upon a map surface. Another object is to provide an instrument which registers distances in hours and minutes of travel time, thereby eliminating the need, and the possibility of errors arising from, the three aforementioned calculation steps. A further object is to provide a flight and arrival time computer of compact size which may be readily adjusted for use in connection with maps of different scale and for accurate time computation involving any of a variety of speeds.

Other objects will appear from the specification and drawings in which:

Figure 1 is a front elevational view of an instrument embodying the present invention;

Figure 2 is a side elevational view of the device shown in Figure 1;

Figure 3 is a rear elevation of the instrument represented in Figures 1 and 2;

Figure 4 is an enlarged face view of a disk with graduated numerals, the disk being adapted for mounting within the instrument for indicating the map scale for which the instrument is adjusted;

Figure 5 is an enlarged face view of a disk similar to that shown in Figure 4 but having different sets of graduated numerals for indicating the flight speed at which the computer is set;

Figure 6 is an enlarged vertical section taken along line 6—6 of Figure 2;

Figure 7 is an enlarged vertical side section taken along line 7—7 of Figure 1;

Figure 8 is a broken sectional view similar in part to Figure 7 but showing a second embodiment of the present invention;

Figure 9 is a vertical and enlarged rear sectional view of the computer taken along line 9—9 of Figure 7;

Figure 10 is an enlarged horizontal section taken along line 10—10 of Figure 9;

Figure 11 is an enlarged vertical sectional view looking rearwardly from line 11—11 of Figure 10;

Figure 12 is an enlarged vertical side section of the instrument taken along line 12—12 of Figure 9;

Figure 13:
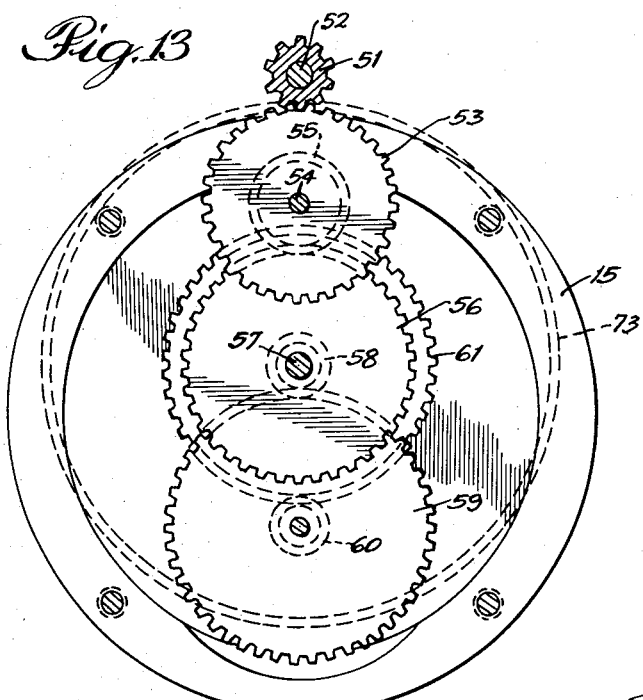
Figure 13 is an enlarged vertical section looking forwardly within the instrument along line 13—13 of Figure 7.

Referring to the drawings the numeral 10 generally designates an instrument having a casing 11 which houses or carries a rotatable rider element or wheel A, time indicating means B, a gear assembly C connected with said time indicating means (Figure 7), a transmission assembly D interposed between the rider element A and the gear assembly C (Figure 7), control means E for adjusting and setting the transmission in accordance with map scale (Figure 14), control means F for adjusting and setting the transmission according to flight speed (Figures 9, 11), and means G cooperable with the gear assembly C for selective adjustment of the time indicating means B.

The instrument has the appearance of a large pocket watch and, as shown in Figures 6 and 11, has a generally circular cross-section. The casing 11 is composed of two main sections: a rear section 12 to which a pair of circular rear cover plates 13 and 14 are secured, and a front section 15 equipped at its front with an annular retainer ring 16 for holding transparent lens 18 in place. The sections of the casing may be formed from steel, plastic, or any other suitable material, and may be secured tightly together by circumferentially spaced screws 19.

Within the chamber of casing 11 is a vertical front mounting plate 20 which is horizontally apertured for rotatably receiving the shafts carrying different gears of the gear assembly C and which is secured to the front section of the casing by screws 21. A vertical rear mounting plate 22 (Figure 7) is similarly secured by screws 23 to the inner surface of the casing's rear section 12 and is provided with a forwardly extending central portion 24 having a horizontal bore extending therethrough. The forwardly projecting portion 24 is also vertically apertured to receive bearings 25 and 26 which in turn receive opposing ends of a pair of vertically aligned transmission shafts, as will be described hereinafter. At its upper and lower ends, the rear mounting plate 22 is provided with a pair of forwardly projecting arms 27 and 28 which are vertically apertured to support annular bearings 29 and 30 in vertical alignment with the bearings 25 and 26 of the central portion 24.

As shown most clearly in Figures 7, 6 and 3 the bottom of the casing's rear section 11 is provided with an opening 31 in which the rider or contact wheel A is rotatably mounted. The contact wheel is centrally apertured and is rotatably mounted upon a horizontal shaft 32 which projects forwardly into opening 31 through a threaded horizontal bore 33 in the casing's rear section. The shaft 32 may be unthreaded and removed from the bore for replacing wheel A with contact wheels of different diameters, such as wheels A' and A" indicated by broken lines in Figures 6 and 7.

Figure 14:
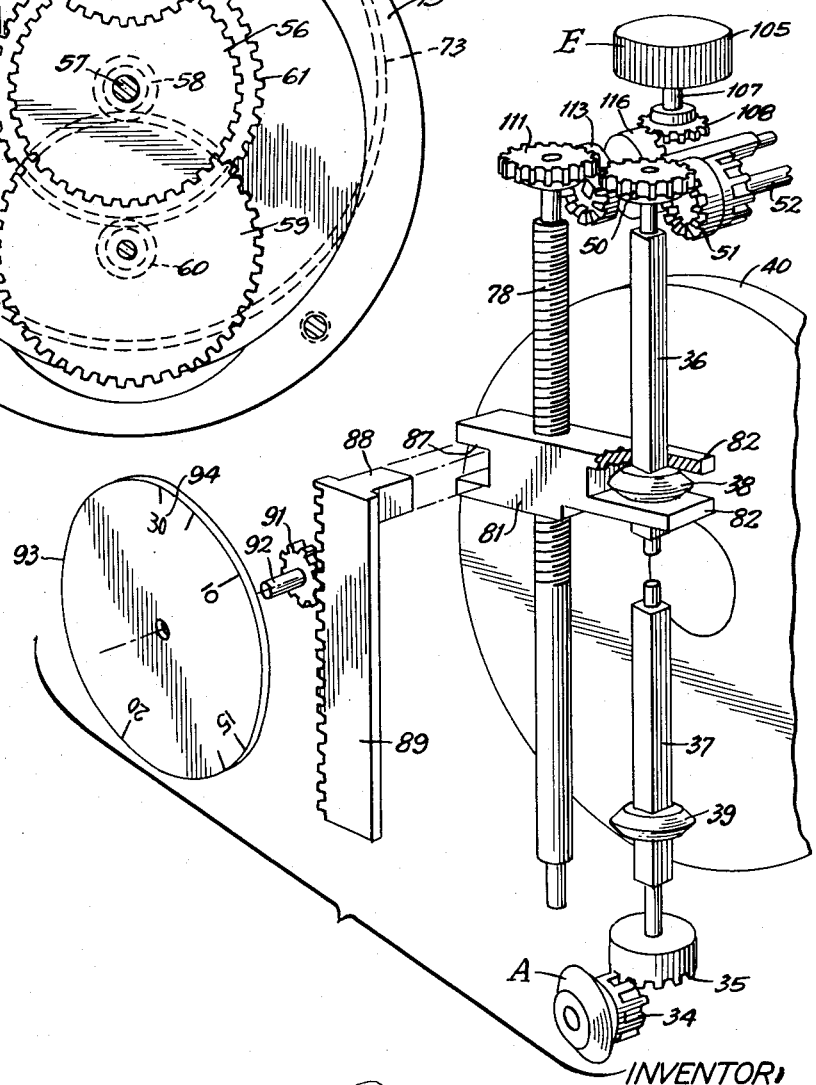
Figure 14 is an enlarged exploded and broken perspective view showing the construction of the instrument's scale and speed adjustment mechanism.

Referring to Figures 7 and 14, it will be noted that the contact wheel A is outwardly tapered to define a narrow edge for contact with a map surface. The shank or hub of the wheel A is provided with gear teeth 34 which mesh with the teeth of horizontal gear 35, thereby operatively coupling the contact wheel A with the variable transmission D of the computer.

Transmission D comprises a pair of vertically extending shafts 36 and 37 provided with axially movable friction wheels 38 and 39 which normally bear against the flat rear surface of a large vertical disk 40. Except for their reduced end portions, shafts 36 and 37 are of non-circular (square) cross-section and, since wheels 38 and 39 are provided with non-circular or square openings extending therethrough, each of the friction wheels is locked against independent relative rotation upon its particular shaft. In Figure 7 it will be seen that the upper and lower ends of the upper shaft 36 are respectively journaled in bearings 29 and 25, while the corresponding ends of the lower shaft 37 are journaled in bearings 26 and 30 of the rear mounting plate 22. The two shafts lie along the same vertical plane and have their longitudinal axes in vertical alignment.

Referring again to Figure 7, it will be observed that the front mounting plate 20 is centrally apertured for slidably receiving a horizontal shaft 41 which in turn carries the rotatable friction disk 40. In the illustration given, disk 40 and shaft 41 are provided with spaced concentric bearing races 42 and 43 respectively with roller bearings 44 disposed therebetween. Thus, the friction disk is rotatably mounted upon shaft 41 and is horizontally movable with reference to stationary mounting plate 20.

Normally the friction disk 40 is urged into contact with friction wheels 38 and 39 by a plate 45 which presses against bearings 46 upon the front surface of the disk and which is urged rearwardly by compression springs 47. Plate 45 is mounted for horizontal sliding movement upon four bolts 48 (Figure 6) secured to the front mounting member 20, the springs 47 being disposed between the mounting member and plate 45 and extending about bolts 48.

From the foregoing it is believed apparent that when contact wheel A is turned the rotational movement is transmitted through gear 35, shaft 37, friction wheel 39, friction disk 40, friction wheel 38, and upper shaft 36. To insure precise or non-slipping coaction between the friction wheels and friction disk, the rear face of the disk may be covered with a sheet 49 of material providing a slightly roughened but durable surface, such as a sheet of nylon. The upper end of shaft 36 is provided with a horizontal gear 50 which normally engages a gear 51 rotatably mounted upon horizontal shaft 52, thereby transmitting rotational movement to the gear assembly C from the contact wheel A.

The gear assembly C comprises a series of gears of proper size and number of teeth for transmitting rotational movement from gear 50 to the time indicating means B. In the illustration given, gear 51 which is freely rotatable upon shaft 52 meshes with gear 53 secured to horizontal shaft 54. Shaft 54 is journaled in plate 20 and the front section 15 of the casing, and carries a second gear 55 which meshes with gear 56 secured to shaft 57. Another smaller gear 58 is secured to shaft 57 and drives gears 59, 60 and 61. Gear 61 is freely rotatable upon shaft 57 and, in the embodiment illustrated in Figure 7, carries at its forward end an hour hand 62. Similarly, the forward end of shaft 57 is provided with a minute hand 63 fixed thereto. Circular dial 64 is disposed directly behind hands 62 and 63 and, as shown in Figure 1, is imprinted with conventional numerals 65 and associated reference lines indicating hours and minutes.

The time indicator reset control G includes a knob 66 externally located at the front of the instrument and securely affixed to the front end portion of horizontal shaft 52. The rear end of the shaft is journaled in arm 27 of the rear mounting member 22, the shaft being supported by arm 27 and bearing 67 of front ring 16 for limited horizontal sliding movement. As shown in Figure 7, shaft 52 is provided with an enlargement 68 between arm 27 and gear 51 so that gears 50 and 51 will be drawn out of engagement as shaft 52 is displaced forwardly. It has already been pointed out that gear 51 is freely rotatable upon shaft 52. Another gear 69 spaced forwardly of gear 51 is also freely rotatable upon shaft 52. The rear face of gear 69 is provided with teeth 70 adapted to interlock with the teeth 71 of a cylindrical member 72 when the cylindrical member is shifted forwardly by forward displacement of the shaft 52 to which it is securely attached. Thus, when the reset mechanism is in the inoperative condition shown in Figure 7, shaft 52 will remain stationary when gear 51 is rotated to drive the remaining gears of the gear assembly C and to move the indicating hands 62 and 63. However, when knob 66 and shaft 52 are displaced forwardly, gear 51 is drawn out of engagement with gear 50 and gear 69 is simultaneously coupled for rotation with shaft 52 by the forwardly displaced cylinder 72.

In Figure 7 it will be seen that gear 69 meshes with a large vertical gear 73 centrally fixed to the hub of gear 61. Since the hub of gear 61 carries hour hand 62, it is apparent that when the reset mechanism is in the illustrated inoperative condition gear 73 will rotate gear 69 freely upon shaft 52 whenever the contact wheel A, transmission D, gear assembly C and hands B are rotated. When the knob 66 and shaft 52 are moved forwardly to disengage gears 50 and 51, the cylinder or clutch member 72 is shifted into engagement with gear 69 so that hands 62 and 63 may be moved to any desired setting upon rotation of knob 66.

Preferably, the cylindrical clutch member 72 is provided with a pair of circumferential grooves 74 and 75. Each of these grooves is adapted to cooperate with a detent structure for frictionally holding the reset mechanism in either its operative or its inoperative position. As shown in Figure 7, the detent structure comprises a ball 76 adapted to seat and ride in either of the grooves of the clutch member, the ball being affixed to the free end of a leaf spring 77 secured at its opposite end to the rear section 12 of the casing 11.

The transmission ratio of contact wheel A and transmission gear 50 may be varied in accordance with map scale and flight speed by shifting the friction wheels 38 and 39 axially along their respective shafts and radially with reference to the large friction disk 40. The control mechanisms for axially displacing the friction wheels will now be described.

Referring to Figures 9 and 12, it will be seen that a pair of threaded shafts 78 and 79 are disposed in parallel relation with aligned shafts 36 and 37 and are spaced on opposite sides of those aligned shafts. Shafts 78 and 79 lie along the same plane as shafts 36 and 37 and are journaled at opposite ends in bearings 80 provided by the rearwardly extending arms 27 and 28 of the rear mounting member 22. A friction wheel guide member 81 is apertured for threadedly receiving shaft 78 and is forked at its inner end to provide spaced fingers 82. The horizontal fingers 82 receive friction wheel 38 therebetween and are provided with vertically aligned apertures 83 for rotatably receiving shaft 36. Therefore, when shaft 78 is rotated the forked member 81 will move either upwardly or downwardly to shift friction member 38 axially along shaft 36.

A similar guide member 84 is carried by threaded shaft 79 and is provided with spaced inner fingers which straddle friction wheel 39 and which are apertured at 86 for rotatably receiving lower shaft 37. The fingers of both of the forked guide members restrain independent axial movement of the friction wheels 38 and 39 but do not interfere with rotation of those wheels or rotation of shafts 36 and 37.

Now referring to Figures 10, 11 and 14, it will be seen that the outer end of guide member 81 is provided with a notch or slot 87 which receives the forward projection 88 of a vertical rack 89. The rack rides in a vertically elongated recess 90 provided in rear mounting plate 22 and the rear wall of the casing, and engages pinion 91 carried by shaft 92. Upon the rear end of the rotatable shaft 92 is mounted a disk 93 having numerals and indicia lines 94 imprinted thereon to represent different map scales.

Guide member 84 is similarly provided with a slot 95 receiving the rearward projection 96 of a vertical rack 97, the rack being vertically slidable in recess 98 and being geared to pinion 99 mounted upon rotatable shaft 100. Shaft 100 carries at its rear end a disk 101 having imprinted thereon radial reference lines 102 each accompanied by a group of three numbers (Figure 5).

Disks 93 and 101 are carried behind the rear face of the casing's rear section 12 and, as shown in Figures 3 and 10, are disposed in side by side relation. The rear cover plates 14 and 13 are secured to the casing's rear face and substantially cover the respective indicator disks 93 and 101. However, each of the cover plates is provided with a window 103 exposing a portion of the disk carried therein and is imprinted or etched with a reference arrow 104 alinable with the reference lines of the disk.

A pair of knobs 105 and 106 are provided at the top of the casing for rotation of shafts 78 and 79 and for thereby varying the transmission ratio to conform with map scale and flight speed. Knob 105 is mounted at the upper end of a rotatable shaft 107 which extends downwardly through the upper wall of the casing and has at its lower end a gear 108. Knob 106 is similarly mounted upon a rotatable shaft 109 which is provided at its lowermost end with a gear 110.

The upper ends of guide shafts 78 and 79 are provided above the arm 27 of the rear mounting plate with gears 111 and 112 respectively (Figure 9). These gears mesh with vertical gears 113 (Figure 12) carried by horizontal shafts 114 and 115. As indicated in Figure 12, shafts 114 and 115 extend between the upper arm of the rear mounting plate 22 and the front wall of the casing 11. The shafts are rotatably mounted and, except for their extreme end portions, are of rectangular cross-section. Gears 116 and 117 are slidably mounted upon shafts 114 and 115 but are not rotatable independently of those shafts. The gears 116 and 117 are urged rearwardly by helical springs 118 extending about the respective shafts and are normally held in disengaged relation with reference to gears 108 and 110 at the lower ends of the shafts to which knobs 105 and 106 are connected.

Since gears 116 and 117 are normally disengaged from gears 108 and 110, rotation of knobs 105 and 106 will not change the setting of friction wheels 38 and 39 and will not produce rotation of disks 93 and 101. However, as shown most clearly in Figures 6 and 12, means are provided for rendering the control knobs operative and for simultaneously disengaging the friction plate 40 from friction wheels 38 and 39 when axial adjustment of those friction wheels is desired. The releasing means includes a shaft 119 rotatably and slidably carried by the hub or central portion 24 of the rear mounting plate 22 and projecting outwardly from the casing through the rear wall thereof (Figures 7 and 10). At its outer exposed end, the shaft is provided with a knob 120 while at its inner end within the casing the shaft is provided with an enlarged disk or head portion 121. When the knob and shaft are pushed forwardly, the head portion bears against the shaft 41 and the friction disk 40 carried thereby and urges these parts forwardly against the force of springs 47. Thus, the friction disk 40 is withdrawn from frictional engagement with wheels 38 and 39. At the same time, plate 45 is displaced forwardly and the upper slotted portion (Figure 6) of this plate engages gears 116 and 117 to urge then forwardly into contact with the gears 108 and 110 directly connected to the control knobs 105 and 106.

In Figure 7 it will be noted that shaft 119 is provided with a catch 122 which will engage the inner surface of the casing's rear wall when the shaft is fully depressed and then rotated. Therefore, by pressing the knob 120 forwardly and then rotating that knob, friction wheels 38 and 39 will remain in released condition while axial adjustment of those wheels is undertaken.

To determine the arrival time at a given destination knob 120 is first pressed forwardly and turned slightly clockwise or counterclockwise so that it is fixed in a forward position releasing friction wheels 38 and 39 from friction disk 40. Knob 105 is then rotated to shift friction wheel 38 axially and to rotate indicator disk 93 until the numeral indicating the desired map scale is in register with the arrow 104 at the back of the instrument. By similarly rotating knob 106 friction wheel 39 is axially displaced and indicator disk 101 is rotated until the numeral representing the mean flight speed of the aircraft is visible through the window of cover 13. Knob 120 is then withdrawn and the reset knob 66 at the front of the instrument is manipulated until the hands 62 and 63 of the clock indicate the existing time of day. The operator then simply rolls the contact wheel across the map surface between the existing location and the destination point and along the expected path of flight. After this has been done, the time of arrival will be indicated by the minute and hour hands on the face of the instrument.

In Figure 5 it will be noted that the speed indicator disk 101 is provided with three concentric groups of reference numerals. In instances where the flight speed is relatively low, reference is made to the outermost group of numerals and contact wheel A is used. If the flight speed is in the intermediate range of 100 to 300 miles per hour then the contact wheel A' of intermediate diameter is used and reference is made to the middle group of numerals. For flight speeds ranging between 150 to 450 miles per hour the largest wheel A" is mounted upon shaft 32 and the operator sets the instrument according to the innermost group of numerals. It will be understood of course that the speed ranges shown on the flight speed disk do not limit the instrument of the present invention for use in connection with speeds of any particular range and that by varying the sizes of the components the instrument may be adapted for use in connection with speeds of any desired range.

If desired, the instrument may be set to indicate directly the flying time required to reach a given destination, rather than the arrival time at that destination. This is accomplished by simply setting the hands 62 and 63 at twelve o'clock (instead of the existing time of day) before the contact wheel is rolled over the map surface.

An important feature in the use of the present invention lies in the fact that the arrival time, or the remaining flight time, will be indicated in hours and minutes. Thus, even a passenger might easily manipulate and read the instrument to determine the estimated flight or arrival time without the risk of making computational errors. A more experienced navigator will find that by checking known landmarks and determining the difference between the actual and estimated time (based on airspeed) in reaching those landmarks he may readily determine the extent of head winds or tail winds and may then reset the device for an extremely accurate time estimate based on groundspeed. This is because the ratio between indicated time and actual time is the same as the ratio between indicated speed (airspeed) and actual speed (ground speed). If desired, the computer may be equipped on its back face or elsewhere with an adjustable logarithmic scale, preferably of circular or rotatable type, which may be readily manipulated to determine the difference between ground speed and air speed when actual flight time does not coincide with the indicated time of arrival at a selected check point.

Like the structure shown in Figures 1 and 7, the modification of Figure 8 is also adapted to register arrival or flight time in hours and minutes. However, in this embodiment the hour and minute hands are eliminated and a disk 150 is substituted for minute hand 63. The face of this disk adjacent the periphery thereof is imprinted with numerals (not shown) indicating minutes while the face of gear 73 adjacent its periphery is imprinted with numerals (not shown) representing the hours. A suitable window is provided in cover 151 to expose portions of the adjacent or concentric sets of numerals upon disk 150 and gear 73, thereby indicating to the observer the time measured in hours and minutes.

While in the foregoing I have disclosed embodiments of the present invention in considerable detail for purposes of illustration, it will be understood by those skilled in the art that many of these details may be varied without departing from the spirit and scope of the invention.

I claim:

1. In a flight time computer having a case housing a time indicator, a gear assembly in drive relation with said indicator, and a rotatable contact wheel adapted to be rolled over a map surface, the combination of a variable transmission carried within said case and operatively interposed between said gear assembly and said contact wheel, said transmission including a rotatable friction disk having a flat surface and a pair of friction wheels engaging said surface, each of said friction wheels having its axis parallel with a radial line of said disk and being movable axially and independently with reference to the other of said friction wheels into varying contact positions of selected radii with reference to said disk, means for axially and independently moving one of said disks into selected axial positions according to map scale, and means for moving the other of said disks into selected axial positions according to flight speed.

2. A time computer for aerial navigation comprising a case containing an indicator having a clock face and a pair of hands for indicating time in minutes and hours, a gear assembly in drive relation with said indicator, a rotatable contact wheel projecting from said case and adapted to be rolled over a map surface, an adjustable transmission including a pair of friction wheels mounted for independent axial movement and being operatively associated with said contact wheel and said gear assembly respectively, a friction disc having a flat face in contact with both of said friction wheels for rotation therewith, and means cooperating with each of said friction wheels for independently varying the respective axial positions thereof according to flight speed and map scale.

3. The structure of claim 2 in which said transmission also includes a pair of rotatable shafts parallel with radial lines of said disk and being respectively connected for rotation with said contact wheel and said gear assembly, said friction wheels being mounted upon said shafts for simultaneous rotation with said shafts and being independently and axially movable thereon.

4. A flight time computer comprising a casing, an indicator provided by said casing and including a pair of superimposed rotatable members for indicating time in minutes and hours, a gear assembly in drive relation with said indicator, a rotatable contact wheel projecting from said casing and adapted to be rolled over a map surface, an adjustable transmission including a friction disc having a flat bearing face, a first friction wheel mounted for rotation about an axis parallel with a radial line of said disc and being operatively associated with said contact wheel to rotate said disc as said contact wheel is rolled over a map surface, a second friction wheel also being mounted for rotation about an axis parallel with a radial line of said disc and being operatively associated with said gear assembly for driving the same as said disc is rotated, each of said friction wheels being mounted for independent axial movement relative to each other, one of said friction wheels being independently axially shiftable for adjusting said computer according to map scale and the other of said friction wheels being independently axially shiftable for adjusting said computer according to flight speed.

5. The structure of claim 4 in which said indicator also includes a clock face, said time indicating members comprising minute and hour hands.

References Cited in the file of this patent

UNITED STATES PATENTS

| 25,423 | Lafever | Sept. 13, 1859 |
| 949,127 | Mellown | Feb. 15, 1910 |
| 1,718,052 | Lineaweaver | June 18, 1929 |

FOREIGN PATENTS

| 46,099 | Austria | Jan. 25, 1911 |